(12) United States Patent
Shockley (10) Patent No.: US 7,286,607 B1
(45) Date of Patent: Oct. 23, 2007

(54) ENERGY-CONTROL METHOD AND APPARATUS FOR DIGITAL DIVERSITY SIGNALING

(75) Inventor: Richard Condit Shockley, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 1020 days.

(21) Appl. No.: 10/335,288

(22) Filed: Dec. 31, 2002

(51) Int. Cl.
*H04L 27/28* (2006.01)
*H04L 1/02* (2006.01)

(52) U.S. Cl. ..................... 375/267; 375/260
(58) Field of Classification Search ............. 375/267, 375/141, 144, 260, 295, 299, 253, 254, 240, 375/222, 346, 367, 148, 323, 130, 231, 147, 375/335, 261, 225; 370/318–323, 329, 330, 370/343, 344, 465, 478, 493, 210, 252, 464, 370/431, 342, 441, 231–233, 235; 455/101–103, 455/115; 713/300, 320
See application file for complete search history.

(56) References Cited

U.S. PATENT DOCUMENTS

| | | | |
|---|---|---|---|
| 4,980,897 A | 12/1990 | Decker et al. | |
| 5,832,387 A | 11/1998 | Bae et al. | |
| 5,903,554 A * | 5/1999 | Saints | 370/342 |
| 5,982,813 A | 11/1999 | Dutta et al. | |
| 6,075,821 A | 6/2000 | Kao et al. | |
| 6,084,906 A | 7/2000 | Kao et al. | |
| 6,084,917 A | 7/2000 | Kao et al. | |
| 6,094,459 A | 7/2000 | Kao et al. | |
| 6,128,348 A * | 10/2000 | Kao et al. | 375/260 |
| 6,289,038 B1 * | 9/2001 | Park | 375/131 |
| 6,333,926 B1 * | 12/2001 | Van Heeswyk et al. | 370/335 |
| 6,370,183 B1 * | 4/2002 | Newson et al. | 375/144 |
| 6,418,161 B1 * | 7/2002 | Shively et al. | 375/222 |
| 6,975,669 B2 * | 12/2005 | Ling et al. | 375/141 |
| 6,985,534 B1 * | 1/2006 | Meister | 375/260 |
| 6,987,819 B2 * | 1/2006 | Thomas et al. | 375/342 |
| 7,031,373 B1 * | 4/2006 | Iyer | 375/148 |
| 7,061,881 B2 * | 6/2006 | Mottier et al. | 370/318 |
| 7,139,323 B2 * | 11/2006 | Erving et al. | 375/260 |
| 7,170,924 B2 * | 1/2007 | Corbaton et al. | 375/148 |
| 2006/0171480 A1 * | 8/2006 | Erving et al. | 375/260 |

* cited by examiner

*Primary Examiner*—Mohammed Ghayour
*Assistant Examiner*—Sophia Vlahos
(74) *Attorney, Agent, or Firm*—Peter A. Lipovsky; Allan Y. Lee

(57) ABSTRACT

A method of communicating digital signal information through diversity signaling with a constrained amount of transmission energy-per-bit available $E_{tot}$. The method includes steps of: measuring channel noise $N_j$ and channel transmission loss $g_j$ on each of a first plurality of diversity channels; and transmitting the digital signal information from a first communications device on each of a second plurality J diversity channels, each with a channel energy allocation $E_j$ responsive to the measurements of channel noise $N_j$ and channel transmission loss $g_j$; wherein j is an integer such that $1 \leq j \leq J$, and wherein the second plurality J diversity channels are selected from the first plurality of diversity channels, responsive to the measurements of channel noise $N_j$ and channel transmission loss $g_j$, and wherein the second plurality J diversity channels are selected responsive to the function $$\frac{\gamma}{(1+\gamma) \cdot (2+\gamma)},$$

wherein γ is a non-negative number.

10 Claims, 7 Drawing Sheets

ENERGY-CONTROL METHOD AND APPARATUS FOR DIGITAL DIVERSITY SIGNALING

BACKGROUND

The energy-control method and apparatus for digital diversity signaling relates to a transmission method and apparatus for diversity signaling, and more particularly, to an energy-control method and apparatus for noncoherent, digital, diversity signaling over fading channels each with generally different noise and transmission loss.

Digital communications systems frequently must operate in fading channels, meaning that the strength of a signal at the receiver is a random variable. In the most widely used analytic model for fading, the Rayleigh-fading channel, the likelihood of deep fading greatly increases the error probability relative to that for the nonfading case, other things being held constant, where the error probability is the likelihood that a transmitted "0" will be interpreted as a "1" by the receiver, or vice versa. To compensate for fading, diversity signaling is often used. Diversity is the transmission of the same bit or set of bits to the same receiver multiple times, or the same bit or set of bits to multiple receivers. This can be done by various means, including the use of several carrier frequencies, known as frequency diversity, or spatially separated antennas called spatial diversity. Other types of diversity include time, polarization, and path diversity.

Standard methods of combining received diversity signals include maximal ratio combining, equal-weight combining, and selection diversity. Maximal ratio combining maximizes the signal-to-noise ratio (SNR) of the statistics, which a coherent receiver computes when determining the transmitted signal, in exactly the same fashion as a matched filter. Equal-weight combining simply sums the received diversity channels, after suitable prior processing, such as basebanding and filtering for the low-pass waveforms being sought. Selection diversity uses a subset of all diversity channels, namely those with the largest SNRs, which are then combined with equal weights.

Conventional diversity systems typically do not use different energies on different diversity channels. One reason for this is that, in many applications, receivers or transmitters must be lightweight, battery powered, and portable, and may need to operate in conjunction with several similar devices. This limits the measurements, calculations, or adaptations the device or set of devices can practically perform to only the simplest types of diversity combining. Another reason is that system designers often assume for simplicity that the noise and transmission loss are equal for each prospective diversity channel. In general, however, neither noise nor transmission loss is apt to be identical on all possible diversity channels. Therefore, it can be appreciated that a method for optimum energy-control in a diversity signaling system is needed.

SUMMARY

The energy-control method and apparatus for digital diversity signaling provides for a method and apparatus of communicating digital signal information through diversity signaling with a constrained amount of transmission energy-per-bit available that addresses the problems mentioned previously. The energy-control method and apparatus for digital diversity signaling is based on the use of the Chernoff bound on the bit error probability. A constant energy constraint is also included by means of a Lagrange undetermined multiplier ($\lambda$).

In one embodiment, the energy-control method for digital diversity signaling provides a method of diversity signaling where the channel noise and channel transmission loss are measured on each of a first plurality of diversity channels and then digital signal information is transmitted on a second plurality of diversity channels, each with a channel energy allocation responsive to the noise and loss measurements.

In a second embodiment, the energy-control method for digital diversity signaling provides a method of diversity signaling where digital signal information is received on a plurality of diversity channels, where the channels and their respective energy allocations were determined by measurements of channel noise and channel transmission loss prior to transmission. The second embodiment further includes the step of producing weighted digital signals by weighting the received digital signal information on each of the diversity channels according to the measurements of channel noise and loss. The weighted digital signals are then combined to produce a digital output that is an estimate of the transmitted digital signal information.

In a third embodiment, the energy-control apparatus for digital diversity signaling provides a transmitter which, given measured channel noise and channel transmission loss on each of a first plurality of diversity channels, transmits digital signal information on a second plurality of diversity channels, each with a channel energy allocation corresponding to the measurements of channel noise and loss.

In a fourth embodiment, the energy-control apparatus for digital diversity signaling provides a receiver that receives digital signal information on a plurality of diversity channels, where the channels and their respective energy allocations were determined by measurements of channel noise and channel transmission loss prior to transmission. The fourth embodiment further includes a weighter for weighting the received digital signal information on each of the diversity channels according to the measurements of channel noise and loss. A combiner then produces a digital output that is an estimate of the transmitted digital signal information.

An advantage of the energy-control method and apparatus for digital diversity signaling is that it provides for nearly optimal performance for a noncoherent, digital, diversity communications system operating over Rayleigh fading channels each with generally different noise and transmission loss.

The previously summarized features and advantages along with other aspects of the energy-control method and apparatus for digital diversity signaling will become clearer upon review of the following specification taken together with the included drawings.

DESCRIPTION OF SOME EMBODIMENTS

Figure 5:
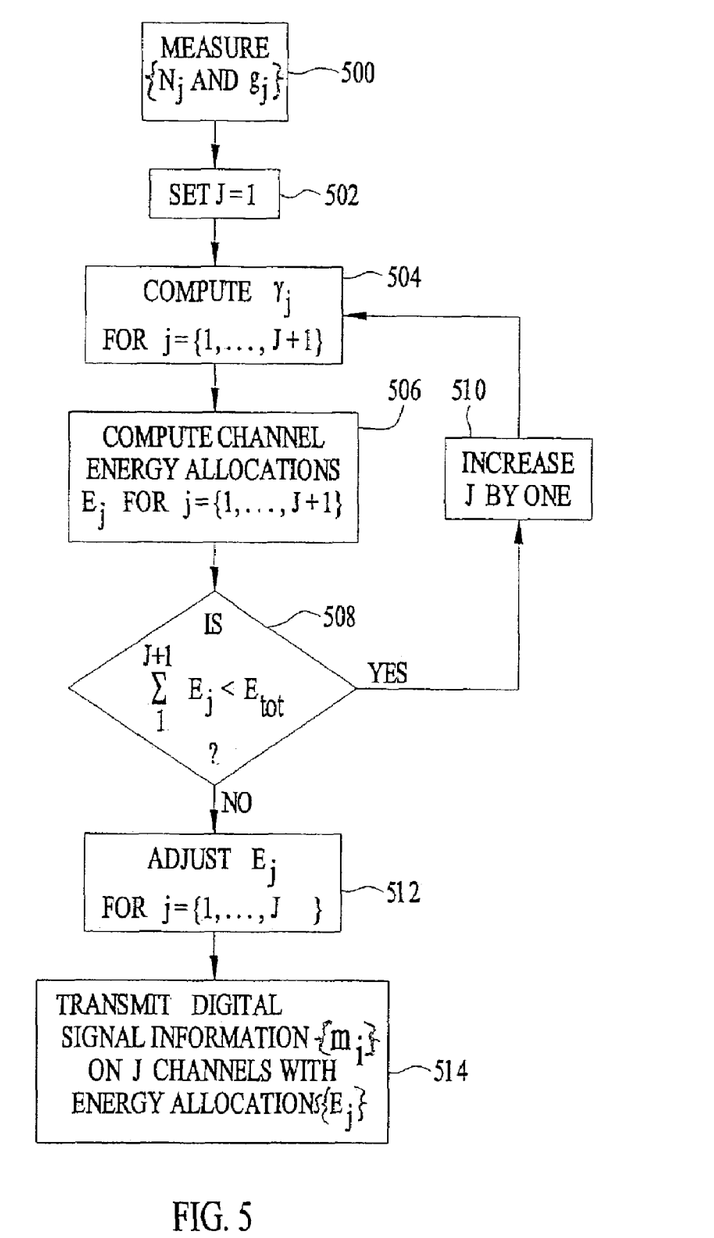
FIG. 5 is a flowchart illustrating an energy-control method for transmitting through diversity signaling, in accordance with the energy-control method and apparatus for digital diversity signaling.

FIG. 5 shows a flowchart of a method of communicating digital signal information $\{m_i\}$ through diversity signaling with a constrained or fixed amount of transmission energy-per-bit ($E_{tot}$) available. Step 500 measures the channel noise ($N_j$) and channel transmission loss ($g_j$) on each of a first plurality of diversity channels. More particularly, it may be assumed that the jth diversity channel adds white Gaussian noise with power spectral density $N_j$. Also, the channel transmission loss may be the mean transmission loss. The first plurality of diversity channels are then labeled from largest to smallest channel signal-to-noise ratio ($\beta_j$) so that $\beta_1 \geq \beta_2 \geq \ldots$, wherein $$\beta_j = \frac{g_j}{N_j}.$$

Figure 1:
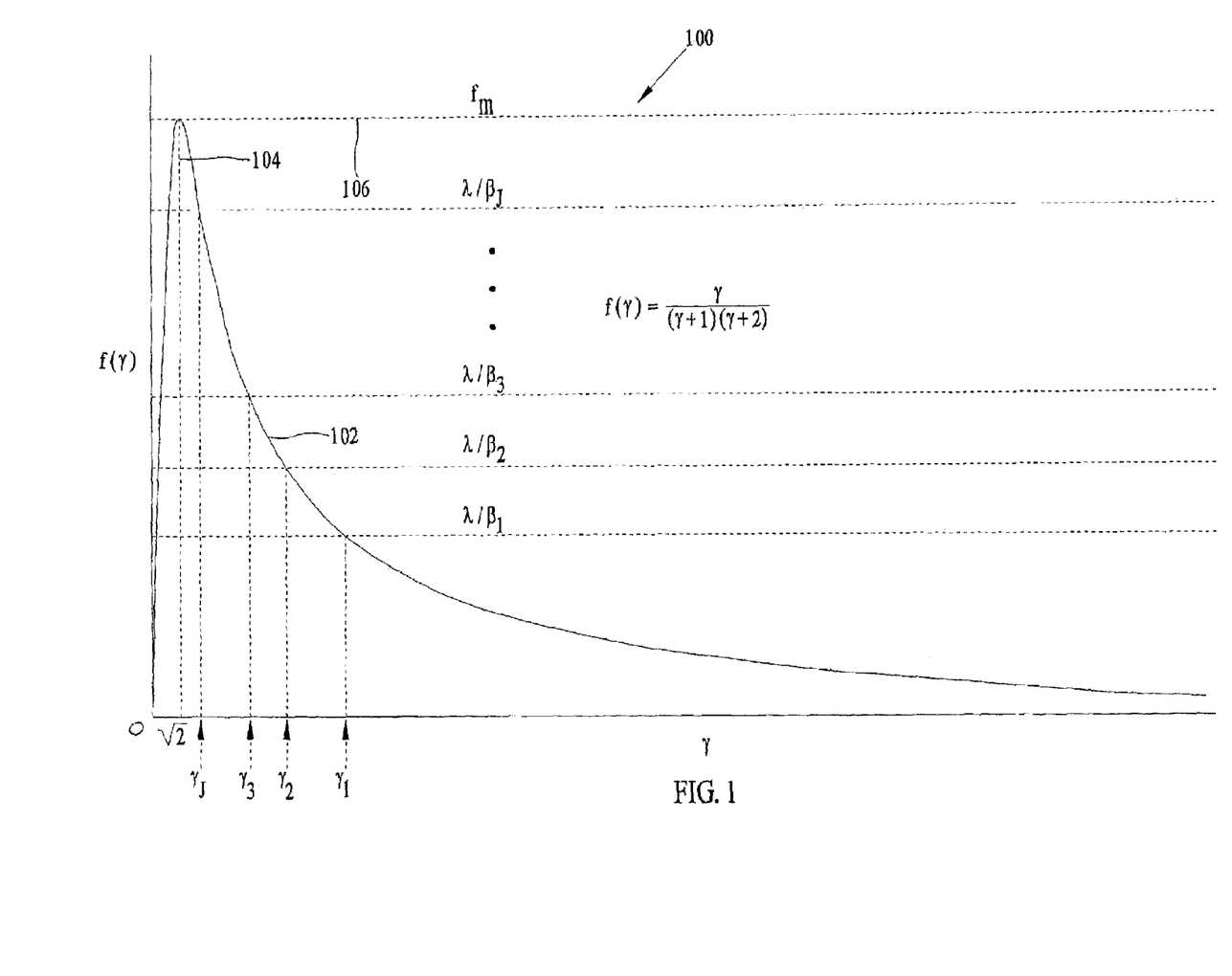
FIG. 1 is a graph of a function used, in accordance with the energy-control method and apparatus for digital diversity signaling.

Step 502 then initializes J, the number of diversity channels to be used, equal to one. In step 504 a $\gamma_j$ is computed for each of channels 1 through J+1, so that $\gamma_j$ satisfies the equations $$f(\gamma_j) = \frac{\beta_{J+1} \cdot f_m}{\beta_j}$$

and $\gamma_j > \sqrt{2}$, wherein $f_m$ is the maximum value 106 of $f(\gamma)$ as shown in FIG. 1. Step 506 then calculates a channel energy allocation ($E_j$) for each of the channels 1 through J+1 where $$E_j = \frac{\gamma_j}{\beta_j}.$$

During step 508 the channel energy allocations, of channels 1 through J+1, are summed together and then compared to the transmission energy-per-bit available. If this sum is less than the transmission energy-per-bit available then J is increased by one (step 510) and steps 504, 506, and 508 are repeated. Alternatively, if the sum of the channel energy allocations of channels 1 through J+1 is greater than the transmission energy-per-bit available then the number of diversity channels to be used is J and we proceed to step 512. If the sum of the channel energy allocations is equal to the transmission energy-per-bit available then J is replaced by J+1 and is the number of channels to be used.

Step 512 adjusts the channel energy allocations of channels 1 through J, such that the sum of these energy allocations is within a predetermined fractional tolerance ($\delta$) of the transmission energy-per-bit available. Step 512 may optionally be a bifurcating search as is shown in more detail in FIG. 6.

Figure 6:
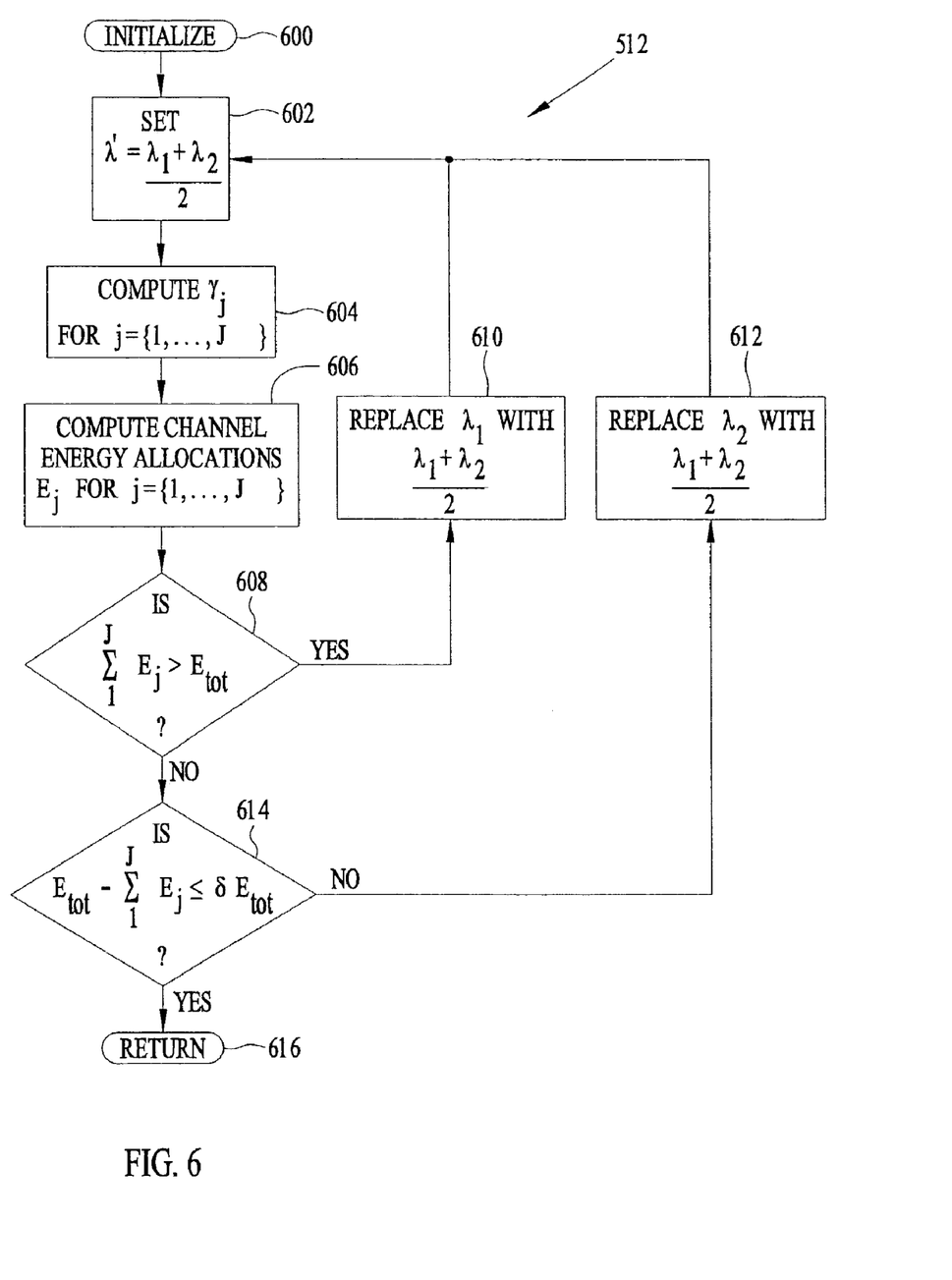
FIG. 6 is a flowchart illustrating in detail step 512 as shown in FIG. 5.

Step 600 starts the bifurcating search, shown in FIG. 6, by initializing a lower bound $\lambda_1 = \beta_1 f(\beta_1 \cdot E_{tot})$ and an upper bound $\lambda_2 = \beta_j f_m$, where the function f(x) is given by $$f(x) = \frac{x}{(1+x) \cdot (2+x)},$$

as shown in FIG. 1. Step 602 then sets $\lambda'$ equal to the average of $\lambda_1$ and $\lambda_2$, given by $$\lambda' = \frac{\lambda_1 + \lambda_2}{2}.$$

In step 604 a new set of $\gamma_j$'s are computed for j={1, . . . ,J}, where each $\gamma_j$ satisfies equations $$\frac{\gamma_j}{(1+\gamma_j) \cdot (2+\gamma_j)} = \frac{\lambda'}{\beta_j}$$

and $\gamma_j > \sqrt{2}$. Step 606 then calculates a new channel energy allocation ($E_j$) for each of the channels 1 through J where $$E_j = \frac{\gamma_j}{\beta_j}.$$

Step 608 sums the channel energy allocations calculated in step 606 and compares this total to the transmission energy-per-bit available. If the sum of the channel energy allocations is larger, then too much energy has been allocated and the lower bound of the bifurcating search ($\lambda_1$) is replaced with the value $$\frac{\lambda_1 + \lambda_2}{2}$$

(step 610) and subsequently, steps 602, 604, 606, and 608 are repeated. Referring again to step 608, if the sum of the channel energy allocations is less than or equal to the transmission energy-per-bit available then we proceed to step 614, where the sum of the channel energy allocations is tested to see whether it is within a predetermined fractional tolerance ($\delta$) of the transmission energy-per-bit available. If $$E_{tot} - \sum_{1}^{J} E_j > \delta \cdot E_{tot},$$

then not enough energy has been allocated to the channels and the upper bound of the bifurcating search ($\lambda_2$) is replaced with the value $$\frac{\lambda_1 + \lambda_2}{2}$$

(step 612) and steps 602, 604, 606, and 608 are then repeated. If, in step 614, $$E_{tot} - \sum_1^J E_j \le \delta \cdot E_{tot}$$

then the bifurcating search is complete and we proceed to step 616 and ultimately on to step 514 of FIG. 5.

Referring back to FIG. 5, step 514 transmits the digital signal information $\{m_i\}$ on the previously determined J channels each with the channel energy allocation $E_j$ determined in step 512. It may be appreciated that multiple bits may be transmitted in step 514 before it is necessary to repeat steps 500 through 512 owing to changes in channel noise ($N_j$) and channel transmission loss ($g_j$) over time.

If J exceeds the total number of available channels, then the energy allocated to any unavailable channels may be distributed uniformly among the remaining available channels, adding to the previously determined channel energy allocation $E_j$. Alternatively, the energy allocated to any unavailable channels may be distributed among the remaining available channels, responsive to the channel signal-to-noise ratios ($\beta_j$) of each channel.

Figure 7:
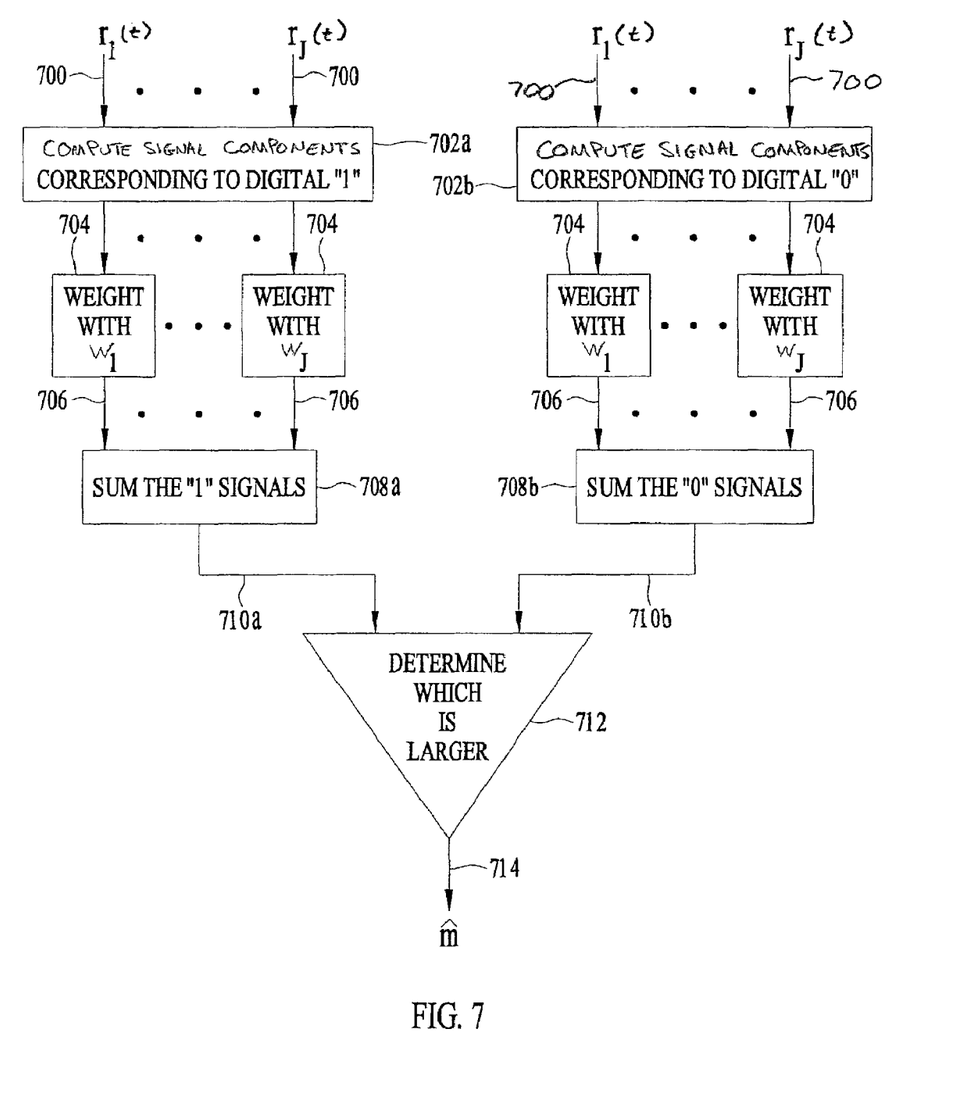
FIG. 7 is a flowchart illustrating an energy-control method for receiving through diversity signaling, in accordance with the energy-control method and apparatus for digital diversity signaling.

The method described previously may optionally include a process of receiving the transmitted digital signal information $\{m_i\}$ and is shown in detail in FIG. 7. Transmitted digital signal information is received on channels 1 through J and sent along two paths, one which looks for digital signal information corresponding to a first digital state and the other which looks for digital signal information corresponding to a second digital state. By way of example, in a binary digital system the first and second digital states may correspond to a digital "0" and a digital "1".

Steps 702a and 702b compute the projections of the received waveforms $\{r_j(t)\}$ onto the baseband waveforms that correspond to the previously mentioned digital states. Step 702a computes projections corresponding to a digital "1" and 702b computes projections corresponding to a digital "0".

Step 704 weights the filtered digital signals with a weight ($w_j$) according to the channel energy allocation and the measurements of channel noise and channel transmission loss. For example, $w_j$ may be calculated using the following:

$$w_j = \frac{\gamma_j/N_j}{1+\gamma_j}$$

where $$\gamma_j = \frac{g_j \cdot E_j}{N_j}.$$

The resultant weighted digital signal 706 is then summed together by steps 708a and 708b. Step 708a sums the weighted digital signals corresponding to a digital "1" and step 708b sums the weighted digital signals corresponding to a digital "0". The sums 710a and 710b are then compared to one another in step 712. Step 712 determines the larger of the two sums. If 710a is larger then the resulting output 714 is set to a digital "1". If 710b is larger then the resulting output 714 is set to a digital "0". Steps 702 through 712 may then be repeated for the next bit or set of bits received.

It may be appreciated that the method of communicating digital signal information may be expanded to a system that includes more than just two digital states.

It may also be appreciated that the method of communicating digital signal information may be implemented using a variety of diversity techniques, such as, but not limited to, the following: frequency diversity, spatial diversity, time diversity, polarization diversity, and path diversity.

Figure 2:
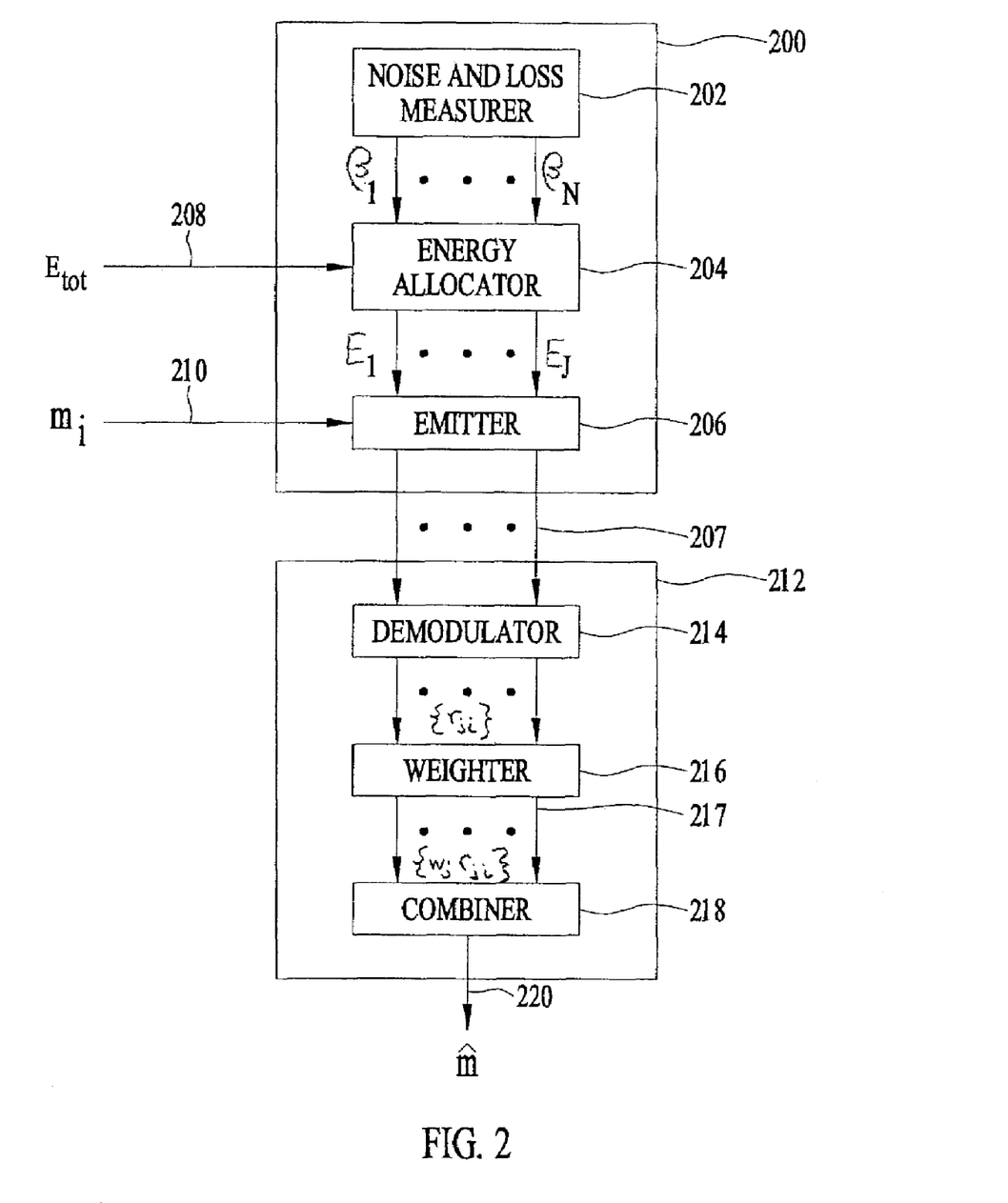
FIG. 2 is a block diagram of a receiver and transmitter, in accordance with the energy-control method and apparatus for digital diversity signaling.

FIG. 2 shows a block diagram of an energy-control apparatus for digital diversity signaling including a transmitter 200 and receiver 212. Transmitter 200 includes a Noise and Loss Measurer which measures channel noise and channel transmission loss on each of a first plurality of diversity channels. More particularly, the channel noise may be the power spectral density of noise and the channel transmission loss may be the mean transmission loss. Energy allocator 204 takes the first plurality of diversity channels and selects a second plurality of channels J and their respective channel energy allocations ($E_j$) given a constrained amount of transmission energy-per-bit ($E_{tot}$) available 208. The channel energy allocations are calculated to correspond to the measurements of channel noise and channel transmission loss and are adjusted such that their sum is within a predetermined fractional tolerance ($\delta$) of the transmission energy-per-bit available. By way of example, the channel energy allocations may be responsive to the function $$f(x) = \frac{x}{(1+x) \cdot (2+x)},$$

as shown in FIG. 1. Emitter 206 emits digital signal information ($m_i$) 210 on each of the second plurality of diversity channels, each with their respective channel energy allocation.

Demodulator 214 of receiver 212 demodulates the previously transmitted digital signal information $m_i$ 210 on each of the second plurality of diversity channels. Weighter 216 produces weighted digital signals 217 by weighting the received digital signal information of each diversity channel according to their channel energy allocation and measurements of channel noise and channel transmission loss. For example, the weight for each channel may be determined using $w_j$, where $$w_j = \frac{\gamma_j/N_j}{1+\gamma_j},$$

and where $$\gamma_j = \frac{g_j \cdot E_j}{N_j}.$$

Combiner 218 combines the weighted digital signals and produces a digital output signal (m̂) 220 that is an estimate of digital signal information $m_i$ 210.

It may be appreciated that the energy-control apparatus for digital diversity signaling may be implemented using a variety of diversity techniques, such as, but not limited to, the following: frequency diversity, spatial diversity, time diversity, polarization diversity, and path diversity.

It may also be appreciated that the energy-control apparatus for digital diversity signaling may be expanded to M-ary signaling through the use of a larger set of baseband waveforms.

Figure 3:
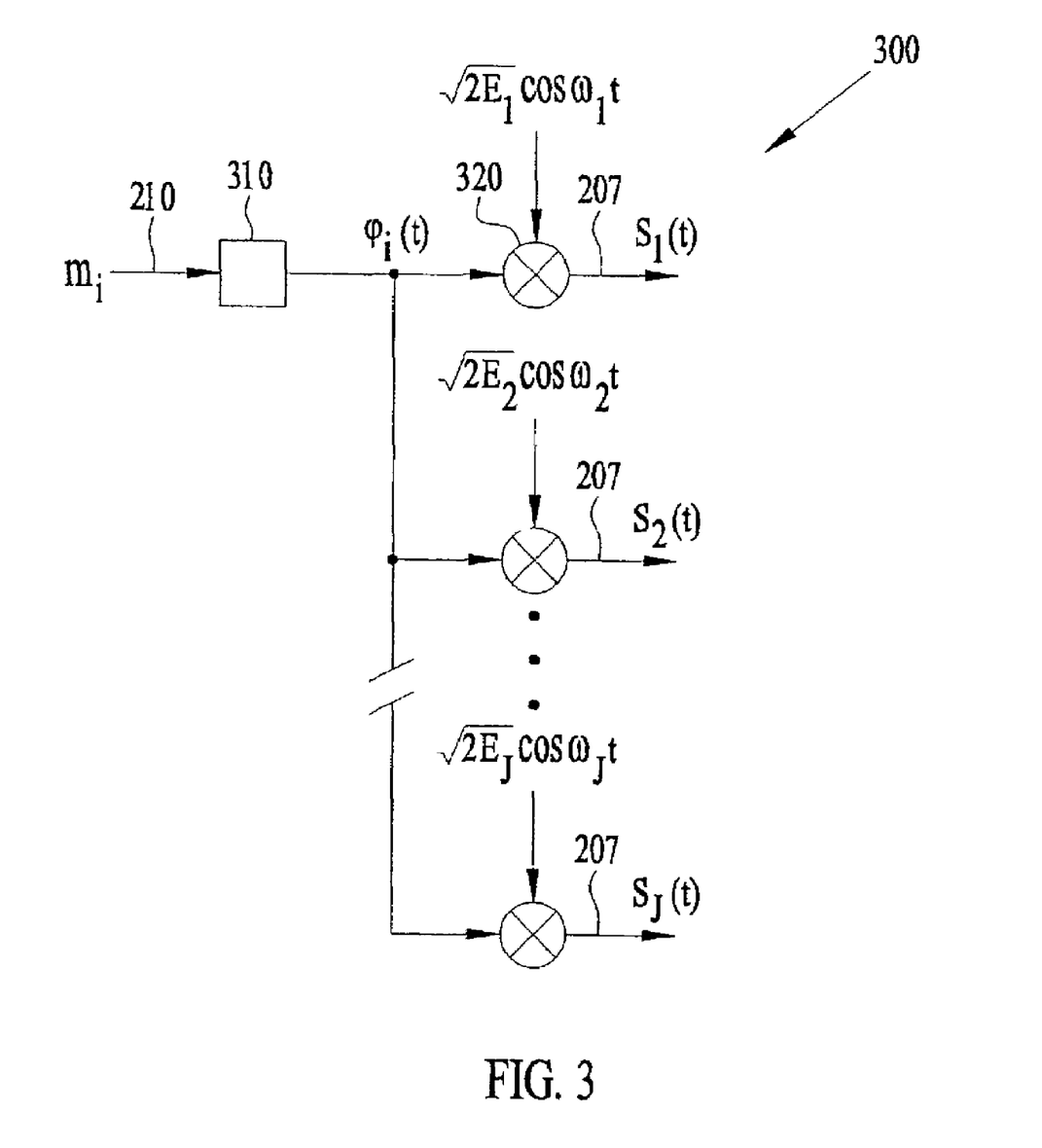
FIG. 3 is a functional schematic of a transmitter, in accordance with the energy-control method and apparatus for frequency diversity signaling.

By way of example, FIG. 3 illustrates a transmitter 300 for an energy-control apparatus for frequency diversity signaling. Transmitter 300 includes a baseband waveform generator 310 and multiplier 320. Digital signal information 210 is inputted into baseband waveform generator 310, which outputs a baseband waveform responsive to a digital "0" or digital "1". The output of the baseband waveform generator 310 is coupled to multipliers 320 on J channels. J channels are selected from a first plurality of diversity channels and their respective channel energy allocations ($E_j$) are subject to a constrained amount of transmission energy-per-bit ($E_{tot}$) available. The channel energy allocations are calculated to correspond to the measurements of channel noise and channel transmission loss and their sum is within a predetermined fractional tolerance (δ) of the transmission energy-per-bit available. By way of example, the channel energy allocations may be responsive to the function $$f(x) = \frac{x}{(1+x) \cdot (2+x)},$$

as shown in FIG. 1. Multipliers 320 output digital signal waveforms each with energy allocation ($E_j$) and each with a different carrier frequency $\omega_j$.

Figure 4:
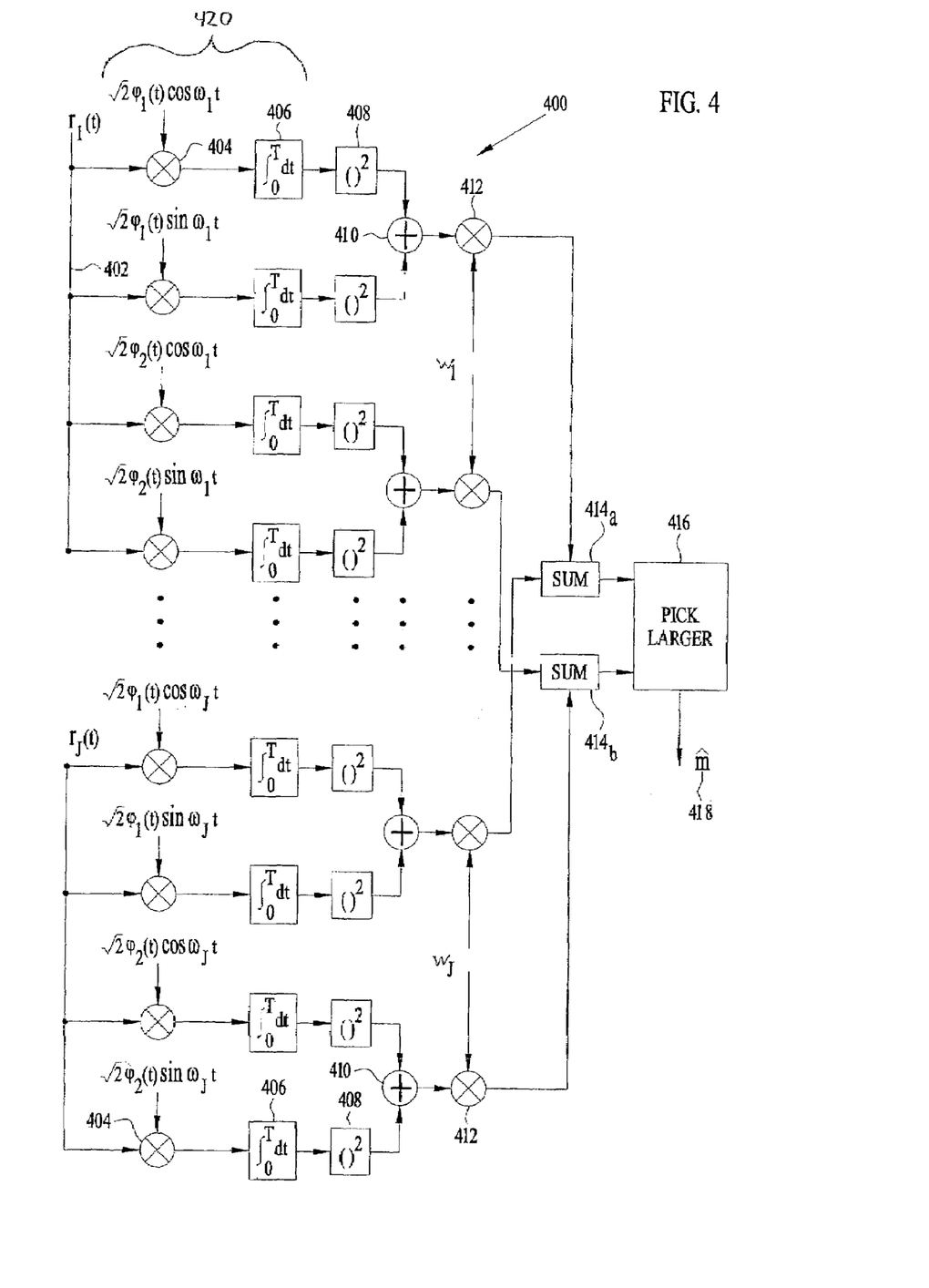
FIG. 4 is a functional schematic of a receiver, in accordance with the energy-control method and apparatus for frequency diversity signaling.

By way of another example, FIG. 4 illustrates a receiver 400 for an energy-control apparatus for frequency diversity signaling. Receiver 400 includes demodulator 420, squarer 408, summer 410, weighter 412, summer 414(a) and (b), and comparator 416.

Receiver 400 optionally includes a demodulator 420 for projecting the received digital diversity waveform. Demodulator 420 may include multiplier 404 and integrator 406. Multiplier 404 outputs signals responsive to the cosine and sine components of the received digital signal waveform 402 at the jth carrier frequency and of the baseband waveforms representing a digital "0" or digital "1". The output of multiplier 404 may be represented by $r_j(t) \cdot \phi_i(t) \cdot \cos(\omega_j t)$ and $r_j(t) \cdot \phi_i(t) \cdot \sin(\omega_j t)$ where $\phi_i(t)$ is the baseband waveform corresponding to a digital "0" or "1". The output of each multiplier is then integrated by integrator 406 for the duration (T) of the baseband waveform ($\phi_i(t)$). The outputs of integrators 406 are then squared by squarers 408. The integrated and squared cosine and sine components of the received digital signal waveform corresponding to one digital state of the jth channel are then summed together by summer 410, the output of which is coupled to weighter 412.

Weighter 412 produces weighted digital signals by weighting the received digital signal information of each diversity channel according to their channel energy allocation and measurements of channel noise and channel transmission loss. For example, the weight for each channel may be determined using $w_j$, where $$w_j = \frac{\gamma_j / N_j}{1 + \gamma_j},$$

and where $$\gamma_j = \frac{g_j \cdot E_j}{N_j}.$$

Referring still to FIG. 4, combiners 414(a) and 414(b) produce an output signal corresponding to the weighted digital signals according to their digital state. For example, combiner 414(a) may output a signal representative of the combination of weighted digital signals corresponding to a digital "0" and combiner 414(b) may output a signal representative of the combination of the weighted digital signals corresponding to a digital "1". Comparator 416 compares the outputs of combiners 414(a) and (b) and produces a digital output signal (m̂) 418 that is responsive to the larger of the two signals.

I claim:

1. A method of communicating digital signal information through diversity signaling with a constrained amount of transmission energy-per-bit available $E_{tot}$, said method comprising the steps of:

measuring channel noise $N_j$ and channel transmission loss $g_j$ on each of a first plurality of diversity channels; and transmitting said digital signal information from a first communications device on each of a second plurality J diversity channels, each with a channel energy allocation $E_j$ responsive to said measurements of channel noise $N_j$ and channel transmission loss $g_j$;

wherein j is an integer such that $1 \leq j \leq J$;

wherein said second plurality J diversity channels are selected from said first plurality of diversity channels, responsive to said measurements of channel noise $N_j$ and channel transmission loss $g_j$ wherein said second plurality J diversity channels are selected responsive to the function $$\frac{\gamma}{(1+\gamma) \cdot (2+\gamma)},$$

wherein γ is a non-negative number.

2. The method as in claim 1, wherein said digital signal information is transmitted on each of said second plurality J diversity channels, each with a channel energy allocation $E_j$ such that $E_j \geq E_{j+1}$ when said second plurality J diversity channels are ordered from largest $\beta_j$ to smallest $\beta_j$ wherein $$\beta_j = \frac{g_j}{N_j}.$$

3. The method as in claim 2, wherein each said channel energy allocation $E_j$ is calculated responsive to the function $$\frac{\gamma}{(1+\gamma)\cdot(2+\gamma)},$$

wherein γ is a non-negative number.

4. The method as in claim 3 further comprising the steps:
(a) setting J=1;
(b) computing $\gamma_j$ satisfying the equations $$\frac{\gamma_j}{(1+\gamma_j)\cdot(2+\gamma_j)} = \frac{\beta_{J+1}\cdot f_m}{\beta_j}$$

and $\gamma_j > \sqrt{2}$, wherein j is a sequence of integers {1, . . . ,J+1} and $$f_m = \frac{\sqrt{2}}{(1+\sqrt{2})\cdot(2+\sqrt{2})};$$

(c) computing channel energy allocations $E_j$ for each said j, wherein $$E_j = \frac{\gamma_j}{\beta_j};$$

and
(d) if $$\sum_1^{J+1} E_j < E_{tot},$$

increasing J by one and repeating steps (b)-(d).

5. The method as in claim 4 further comprising the step of adjusting said channel energy allocations $E_j$, such that $$E_{tot} - \sum_1^J E_j \leq \delta\cdot E_{tot},$$

wherein $0 < \delta \leq 1$.

6. The method as in claim 5, wherein said adjustment is made by a bifurcating search responsive to said measurements of channel noise $N_j$ and channel transmission loss $g_j$.

7. The method as in claim 6, wherein said bifurcating search is responsive to the function $$\frac{x}{(1+x)\cdot(2+x)}.$$

8. A method of communicating digital signal information through diversity signaling with a constrained amount of transmission energy-per-bit available $E_{tot}$, said method comprising the steps of:
measuring channel noise $N_j$ and channel transmission loss $g_j$ on each of a first plurality of diversity channels; and
transmitting said digital signal information from a first communications device on each of a second plurality J diversity channels, each with a channel energy allocation $E_j$ responsive to said measurements of channel noise $N_j$ and channel transmission loss $g_j$;
wherein j is an integer such that $1 \leq j \leq J$;
receiving said transmitted digital signal information on each of said second plurality J diversity channels on a second communications device;
producing a weighted digital signal for each of said second plurality J diversity channels by weighting said received digital signal information of each said second plurality J diversity channels according to said channel energy allocation $E_j$ and said measurements of channel noise $N_j$ and channel transmission loss $g_j$; and
producing a digital output signal by combining said weighted digital signals.

9. The method as in claim 8, wherein said weighted digital signals are produced by weighting said received digital signal information with channel weights $w_j$, wherein $$w_j = \frac{\gamma_j/N_j}{1+\gamma_j}$$

where $$\gamma_j = \frac{g_j\cdot E_j}{N_j}.$$

10. The method as in claim 8, further comprising the steps of:
producing a first plurality of filtered digital signals corresponding to a first digital state by filtering said received digital signal information of each said second plurality J diversity channels; and
producing a second plurality of filtered digital signals corresponding to a second digital state by filtering said received digital signal information of each said second plurality J diversity channels.

* * * * *